US012674464B2

(12) United States Patent
Yasuda

(10) Patent No.: US 12,674,464 B2
(45) Date of Patent: Jul. 7, 2026

(54) ROTOR FOR ELECTRIC WATER PUMPS AND SLIDING BEARING DEVICE FOR WATER PUMPS

(71) Applicant: NTN CORPORATION, Osaka (JP)

(72) Inventor: Ken Yasuda, Mie (JP)

(73) Assignee: NTN CORPORATION, Osaka (JP)

( * ) Notice: Subject to any disclaimer, the term of this patent is extended or adjusted under 35 U.S.C. 154(b) by 179 days.

(21) Appl. No.: 17/798,551

(22) PCT Filed: Feb. 10, 2021

(86) PCT No.: PCT/JP2021/005087
§ 371 (c)(1),
(2) Date: Aug. 9, 2022

(87) PCT Pub. No.: WO2021/162060
PCT Pub. Date: Aug. 19, 2021

(65) Prior Publication Data
US 2023/0086277 A1 Mar. 23, 2023

(30) Foreign Application Priority Data

Feb. 10, 2020 (JP) ................................. 2020-020918
Sep. 23, 2020 (JP) ................................. 2020-159067

(51) Int. Cl.
*F04D 29/041* (2006.01)
*F04D 13/06* (2006.01)
(Continued)

(52) U.S. Cl.
CPC ......... *F04D 29/0413* (2013.01); *F04D 13/06* (2013.01); *F04D 29/046* (2013.01);
(Continued)

(58) Field of Classification Search
CPC .... F04D 13/06; F04D 29/0413; F04D 29/046; F04D 29/0473; F16C 17/02; F16C 17/047; F16C 17/107; F16C 33/1075; F16C 33/20
See application file for complete search history.

(56) References Cited

U.S. PATENT DOCUMENTS 4,326,758 A * 4/1982 Nozue ................... F16C 17/047
384/368
5,184,945 A 2/1993 Chi-Wei
(Continued)

FOREIGN PATENT DOCUMENTS

CN 107110202 A 8/2017
EP 3239543 A1 11/2017
(Continued)

OTHER PUBLICATIONS

Crane TP-410 Chapters 1-2 & Appendix A (Year: 2013).*
(Continued)

*Primary Examiner* — Charles G Freay
*Assistant Examiner* — Joseph S. Herrmann
(74) *Attorney, Agent, or Firm* — Hedman & Costigan, P.C.; James V. Costigan; Kathleen A. Costigan

(57) ABSTRACT

To provide a rotor for electric water pumps in which a sliding bearing formed of a thermoplastic resin composition can be produced at a low cost and has superior low friction and low wear property, and an inner diameter of the sliding bearing is hardly contracted by the insert-molding. A rotor 1 used for electric water pumps has a main body 2 that supports an impeller of the pump, a sliding bearing 3 that rotatably supports a shaft, and a magnet 4 disposed to face a stator. The sliding bearing 3 is an annealing treated body of a polyphenylene sulfide resin composition. The polyphenylene sulfide resin composition contains 5-30 vol % of carbon fiber, 1-20 vol % of polytetrafluoroethylene resin and (Continued)

1-30 vol % of graphite relative to the whole volume of the polyphenylene sulfide resin composition. The main body 2 is an injection-molded body disposed by insert-molding a thermoplastic resin composition, which is different from the polyphenylene sulfide resin composition, at an outer diameter side of the sliding bearing 3.

4 Claims, 16 Drawing Sheets

(51) Int. Cl.
| | |
|---|---|
| *F04D 29/046* | (2006.01) |
| *F04D 29/047* | (2006.01) |
| *F16C 17/02* | (2006.01) |
| *F16C 33/20* | (2006.01) |

(52) U.S. Cl.
CPC .......... *F04D 29/0473* (2013.01); *F16C 17/02* (2013.01); *F16C 33/20* (2013.01)

(56) References Cited

U.S. PATENT DOCUMENTS

| | | | | |
|---|---|---|---|---|
| 5,602,945 | A | * | 2/1997 | Davis ........................ B02C 2/00 |
| | | | | 384/368 |
| 2013/0082554 | A1 | * | 4/2013 | Yu ........................ F16C 33/745 |
| | | | | 310/90 |
| 2016/0040712 | A1 | * | 2/2016 | Komatsubara ........ F16C 33/145 |
| | | | | 310/90 |
| 2016/0341251 | A1 | * | 11/2016 | Yoshizuka .............. B22F 5/106 |
| 2017/0350407 | A1 | | 12/2017 | Yamamoto et al. |

FOREIGN PATENT DOCUMENTS

| | | | | |
|---|---|---|---|---|
| JP | 11-030196 | A | | 2/1999 |
| JP | 3099434 | B | | 10/2000 |
| JP | 2006-200427 | A | | 8/2006 |
| JP | 2007-051705 | A | | 3/2007 |
| JP | 2007185073 | A | * | 7/2007 |
| JP | 2010-43666 | | * | 2/2010 |
| JP | 4812787 | B | | 11/2011 |
| JP | 5761560 | B | | 8/2015 |
| JP | 2015-183650 | A | | 10/2015 |
| JP | 2015183650 | | * | 10/2015 |
| JP | 2017025742 | A | * | 2/2017 |
| WO | 2015146741 | A1 | | 10/2015 |
| WO | 2016104535 | A1 | | 6/2016 |

OTHER PUBLICATIONS

Calculus—early transcendental functions 2nd edition; formulas from geometry & pp. A17-A21 (Year: 1999).*
Machine translation of JP 4812787 B dated Nov. 9, 2011.
Machine translation of JP 11-030196 A dated Feb. 2, 1999.
Machine translation of JP 3099434 B dated Oct. 16, 2000.
Machine translation of JP 2006-200427 A dated Aug. 3, 2006.
Machine translation of JP 5761560 B dated Aug. 12, 2015.
Machine translation of JP 2015-183650 A dated Oct. 22, 2015.
Machine translation of JP 2007-051705 A dated Mar. 1, 2007.
Machine translation of abstract of CN 107110202 A dated Aug. 29, 2017.
Supplementary European Search Report issued in the corresponding European Patent Application—mailed Apr. 20, 2024.

* cited by examiner

ROTOR FOR ELECTRIC WATER PUMPS AND SLIDING BEARING DEVICE FOR WATER PUMPS

TECHNICAL FIELD

The present invention relates to a rotor for electric water pumps, to which an impeller and a magnet is mounted, the rotor being supported on a shaft via a sliding bearing, in particular relates to a rotor for electric water pumps for cooling automobile inverters or combustion engines. Further, the present invention relates to a sliding bearing device for water pumps used for circulating cooling water in combustion engines, inverters, batteries or fuel cells in automobiles or for circulating hot water in water heaters or floor heaters.

BACKGROUND ART

Conventionally, an electric water pump used for cooling an inverter or a combustion engine of an automobile has been proposed in Patent Document 1. A structure of a rotor for this kind of the electric water pump is described with reference to FIG. 3. A rotor 11 shown in FIG. 3 has a ring-like magnet 12, a sliding bearing 13, and a main body 14 with which an impeller mount part 15 is integrated.

The sliding bearing 13 is formed in a substantially hollow cylindrical shape and is configured to rotatably support a shaft of the pump. As a material of the sliding bearing 13, thermoplastic resin such as polyphenylene sulfide (PPS) resin containing carbon, sintered carbon, ceramic or the like is employed. Further, Patent Document 2 exemplarily discloses polyether ether ketone (PEEK) resin, polysulfone (PSF) resin, polyether-imide (PEI) resin, and phenol resin as other materials for underwater sliding bearings.

The main body 14 is injection-molded using thermoplastic resin such as PPS resin in a state in which the magnet 12 and the sliding bearing 13 disposed coaxially inside the magnet 12 are arranged in a molding die. With this, the magnet 12, the sliding bearing 13, and the main body 14 are integrated.

A structure and an action of the electric water pump using the rotor shown in FIG. 3 is described with reference to FIG. 4. A pump 21 is provided with the rotor 11 housed in a case. The case is formed by integrating a stator 22 that has a coil wound on a stator core formed by laminating electromagnetic steel plates, a seal box 23 that separates cooling water and the stator, and a casing 24 that forms a pump chamber together with the seal box 23. One end of a shaft 25 formed of stainless steel or ceramic is inserted into a shaft supporting part of the seal box 23, and the other end thereof is supported by a shaft supporting part of the casing 24. The rotor 11 having the magnet 12 is rotated around the shaft 25 due to a magnetic field caused by energizing the coil of the stator 22. An impeller 26 is fixed to the rotor 11, and thus the impeller 26 is also rotated in response to the rotation of the rotor 11. The water sucked into the pump chamber is pressure-fed by the impeller 26.

A water pump is used for circulating cooling water in combustion engines, inverters, batteries or fuel cells in automobiles or for circulating hot water in water heaters or floor heaters. Conventionally, a magnet pump disclosed in Patent Document 4 and a DC brushless pump disclosed in Patent Document 5 have been known as representative examples of the water pump for such a use. A conventional water pump is described with reference to FIG. 16. FIG. 16 is a sectional view of a DC brushless pump. In a pump 51, a motor 62 includes a winding 52 disposed as a coil to generate a magnetic field, and a controller controls the generation of the magnetic field. An impeller 54 fixed to a permanent magnet 53 is rotatably supported on a shaft 55 to follow the generated magnetic field. When the impeller 54 is rotated in response to the rotating magnetic field, the circulation water is sucked and discharged. The shaft 55 is fixed to a casing 56 and supported by a shaft supporter 57a of a cover 57. The impeller 54 is rotatably supported on the shaft 55 via a sliding bearing 58. Thus, the shaft 55 and the sliding bearing 58 rotationally slide to each other. Both end surfaces of the sliding bearing 58 rotationally slide about a thrust direction on thrust plates 59, 60 disposed between the shaft supporter 57a of the cover 57 and the sliding bearing 58 and between the casing 56 and the sliding bearing 58, respectively. Small gaps are formed between the both end surfaces of the sliding bearing 58 and the thrust plates 59, 60, respectively.

The impeller 54 is rotated by the attraction and repulsion of the permanent magnet 53 fixed thereto in response to the rotating magnetic field generated by the winding 52. Thus, a pump action is generated to suck the circulation water from a direction shown by an arrow X and discharge the circulation water toward a direction shown by an arrow Y. The impeller 54 is pushed toward the cover 57 by the differential pressure at this time, so that the end surface of the sliding bearing 58 and the thrust plate 59 rotationally slide to each other. On the other hand, the sliding bearing 58 and the thrust plate 60 at a side of the casing 56 hardly slide to each other. The sliding thereof is only caused at a timing of activation or stop of driving, or during the abnormal driving such as idling of the pump driven without the circulation water. Thus, in some case, the sliding bearing 58 is slid directly on the casing 56 without using the thrust plate 60 at the side of the casing 56.

In the above-described water pump, a lubrication groove is formed on either the sliding bearing or a thrust receiver, so that a friction coefficient can be reduced. Here, Patent Document 6 discloses a thrust support device including a collar that has a sliding surface orthogonal to a rotational shaft and is fixed to the rotational shaft, and a thrust bearing that is fixed to a fixed member and is configured to rotate relative to and along the sliding surface. The thrust bearing includes a land part parallel to the sliding surface of the collar, a tapered part inclined to the sliding surface and configured to generate dynamic pressure in lubrication liquid between the collar and the tapered part by relative rotation thereof, and a groove. The friction coefficient is reduced by generating the dynamic pressure using the tapered part.

Further, the present inventors have disclosed a water pump having at least one of a suction unit and a discharge unit (see Patent Document 7). The suction unit is configured to suck the circulation water from a side of one end surface of the sliding bearing toward a side of an inner diametrical surface of the bearing. The discharge unit is configured to discharge the circulation water from the side of the inner diametrical surface of the bearing toward a side of the other surface. This water pump improves supplying performance (discharge performance) of the circulation water to the sliding surface, so that low friction can be realized.

PRIOR ART DOCUMENTS

Patent Documents

Patent Document 1: JP 4812787 B
Patent Document 2: JP H11-030196 A

Patent Document 3: JP 2017-025742 A
Patent Document 4: JP 3099434 B
Patent Document 5: JP 2006-200427 A
Patent Document 6: JP 5761560 B
Patent Document 7: JP 2015-183650 A

SUMMARY OF THE INVENTION

Problems to be Solved by the Invention

As described above, in Patent Document 1, the rotor for electric water pumps is formed by injection-molding a thermoplastic resin after inserting the sliding bearing into the molding die. In a case in which the sliding bearing is formed of sintered carbon or ceramic, the cost thereof is high, and further a degree of freedom of design is deteriorated because such a bearing cannot be formed by means of injection-molding. Thus, the thermoplastic resin such as PPS resin containing carbon is preferably employed.

The elastic modulus of the thermoplastic resin is reduced at high temperature, and thus when the sliding bearing and the rotor are integrated by the insert-molding, the inner diameter of the sliding bearing is contracted due to the injection-molding pressure. When an inner diameter contraction amount is large, management of a radial gap becomes difficult. The present inventors have disclosed a rotor using a sliding bearing of a phenol resin composition molded body (see Patent Document 3) in order to reduce the inner diameter contraction amount. The phenol resin composition has a thermosetting property. Thus, the elastic modulus of the phenol resin composition is hardly reduced at high temperature, and the inner diameter contraction amount in the insert-molding can be reduced. Further, the phenol resin composition contains a phenol resin as a main component, and at least (A) carbon fiber and (B) a solid lubricant of at least one of polytetrafluoroethylene (PTFE) resin and graphite. Accordingly, the phenol resin composition has low friction and low wear property in water.

However, a method for reducing the inner diameter contraction amount when a molded body of the thermoplastic resin composition is used for the sliding bearing is not disclosed in Patent Document 3.

An object of the present invention (the first invention) is, in order to solve such problems, to provide a rotor for electric water pumps in which a sliding bearing formed of a thermoplastic resin composition is produced at a low cost, and an inner diameter of the sliding bearing is hardly contracted by the insert-molding. Consequently, the rotor for electric water pumps realizes superior low friction and low wear property.

In recent years, a friction coefficient reduction for saving energy and a vibration reduction for improving silent performance are required in water pumps. In the thrust bearing of Patent Document 6, the tapered part that generates the dynamic pressure in the lubrication liquid between the collar and the tapered part by the relative rotation is formed, however the inclined angle and the length of the tapered part are not disclosed. Further, in the thrust bearing exemplarily disclosed in Patent Document 6, a boundary between the tapered part and the land part is formed along the radial direction of the thrust bearing. However, there is still room for further improvement of a dynamic pressure effect.

An object of the present invention (the second invention) is, in order to solve such problems, to provide a sliding bearing device for water pumps that imparts a superior dynamic pressure effect to a lubrication groove formed on an end surface of a sliding bearing or a thrust receiver to reduce a friction coefficient therebetween.

Means for Solving the Problems

A rotor for electric water pumps of the first invention of the present disclosure is configured to be used in an electric water pump that has: the rotor that rotates around a shaft; and a stator disposed on a circle coaxial to the shaft and configured to rotationally drive the rotor. The rotor comprises a main body that supports an impeller of the pump, a sliding bearing that rotatably supports the shaft, and a magnet disposed to face the stator. The sliding bearing is an annealing treated body of a PPS resin composition. The PPS resin composition contains 5-30 vol % of carbon fiber, 1-20 vol % of PTFE resin and 1-30 vol % of graphite relative to the whole volume of the PPS resin composition. The main body is an injection-molded body disposed by insert-molding a thermoplastic resin composition, which is different from the PPS resin composition, at an outer diameter side of the sliding bearing.

Here, the thermoplastic resin composition for forming the main body, which is different from the PPS resin composition for forming the sliding bearing, means the thermoplastic resin composition of which the composition is different from that of the PPS resin composition. That is, "the composition is different" means that not only the raw materials are different but also the raw materials are identical while the composition rates thereof are different.

An inner diameter contraction amount of the sliding bearing caused by the insert-molding of the thermoplastic resin composition at the outer diameter side of the sliding bearing may be smaller than that of a sliding bearing formed of a molded body of the PPS resin composition that is not subjected to an annealing treatment.

The bending elastic modulus of the molded body of the PPS resin composition may be 3,000 MPa or more at 130° C.

Here, the molded body of the PPS resin composition means a molded body before the annealing treatment is applied thereto, and the same shall apply hereinafter.

A sliding bearing device for water pumps of the second invention of the present disclosure is configured to be used in a water pump that has: an impeller; a shaft that fixes the impeller; a cylindrical sliding bearing fixed to the impeller for rotatably supporting the impeller relative to the shaft; cylindrical thrust receivers that slide on respective end surfaces of the sliding bearing; and a casing and a cover that house the impeller and form a pump chamber, the water pump being configured to suck and discharge circulation water through the pump chamber using rotation of the impeller. The sliding bearing device for water pumps comprises the sliding bearing and the thrust receivers. A land part serving as a sliding surface, and a lubrication groove that discharges the circulation water from an inner diameter side toward an outer diameter side are formed on a surface of at least one component of (A) at least one end surface of the sliding bearing, and (B) the thrust receiver. The lubrication groove has an inclined surface inclined relative to the land part and is configured to generate dynamic pressure due to the relative rotation between the sliding bearing and the thrust receiver. In a projection view of the surface on which the lubrication groove is formed, seen from a front side (in an axial direction) thereof, the lubrication groove is formed by a region surrounded by: a line A and a line B each extending on the surface from the inner diameter side to the outer diameter side; a circular arc C along an inner diametrical surface; and a circular arc D along an outer diametrical surface. The length of the circular arc C is equal to or more than the length of the circular arc D.

The "thrust receiver" in the second invention includes not only a special thrust plate disposed for receiving a thrust load of the sliding bearing but also other component such as a casing that receives the thrust load. Further, the "circulation water" includes not only water but also an antifreeze solution, and a chemical solution.

An angle between the line A and the line B may be 0-15 degrees.

The line A may be located at an upstream side relative to the line B in a direction of the relative rotation. A sectional shape of the lubrication groove cut by any cutting plane orthogonal to the line A may be a generally right triangle having a hypotenuse on the inclined surface. An inner angle relating to an apex defined by an intersection point between the line A and the cutting plane may be 3-30 degrees. Here, the "direction of the relative rotation" denotes a rotating direction of one component among the sliding bearing and the thrust receiver in a case in which one component rotates, or a direction opposite to a rotating direction of a mating component in a case in which the mating component rotates.

The maximum depth of the lubrication groove may be 0.1-1.0 mm.

The lubrication grooves may be disposed on the surface at any intervals in the circumferential direction.

The component on which the lubrication groove is formed may have an axial center on an extension line of the line A. Each of the lubrication grooves may be disposed offset from the center line passing the line A of the component, toward a downstream side in the direction of the relative rotation.

The sliding bearing may be an injection-molded body of a resin composition. The sliding bearing may have the lubrication groove on at least one end surface thereof. The sliding bearing may have a gate mark on an outer diametrical surface. A weld part may be formed within the lubrication groove and is not formed on the land part.

Effect of the Invention

The present inventors found and invented the first invention that the sliding bearing formed of a thermoplastic resin composition in the rotor for electric water pumps can be produced at a low cost and has superior low friction and low wear property, and an inner diameter of the sliding bearing is hardly contracted by the insert-molding by employing the rotor for electric water pumps having the following configuration in which: the electric water pump has the rotor that rotates around a shaft, and a stator disposed on a circle coaxial to the shaft and configured to rotationally drive the rotor; the rotor comprises a main body that supports an impeller of the pump, a sliding bearing that rotatably supports the shaft, and a magnet disposed to face the stator; the sliding bearing is an annealing treated body of a PPS resin composition; the PPS resin composition contains 5-30 vol % of carbon fiber, 1-20 vol % of PTFE resin and 1-30 vol % of graphite relative to the whole volume of the PPS resin composition; and the main body is an injection-molded body disposed by insert-molding a thermoplastic resin composition, which is different from the PPS resin composition, at an outer diameter side of the sliding bearing. The reason that the sliding bearing can be produced at a low cost is that the thermoplastic resin composition is easy to mold the sliding bearing compared to a thermosetting resin composition such as phenol resin and a crushed material of a sprue and runner generated when producing the sliding bearing by means of injection-molding can be recycled. Thus, the rotor for electric water pumps of the first invention has superior cost performance.

The inner diameter contraction amount of the sliding bearing caused by the insert-molding of the thermoplastic resin composition at the outer diameter side of the sliding bearing is smaller than that of a sliding bearing formed of a molded body of the PPS resin composition that is not subjected to an annealing treatment. Thus, the inner diameter contraction amount caused by the insert-molding can be reduced, and a radial gap can be managed accurately. Consequently, vibration of the rotor when the electric water pump is driven can be reduced and seizure of the rotor can be prevented.

The bending elastic modulus of the molded body of the PPS resin composition is 3,000 MPa or more at 130° C., and thus superior rigidity at high temperature can be obtained and the inner diameter contraction amount of the sliding bearing caused by the insert-molding can be reduced.

The sliding bearing device of the second invention has the land part serving as a sliding surface, and the lubrication groove that discharges the circulation water from the inner diameter side toward the outer diameter side, on a surface of at least one component of the sliding bearing and the thrust receiver. The lubrication groove has the inclined surface inclined relative to the land part and is configured to generate dynamic pressure due to the relative rotation between the sliding bearing and the thrust receiver. Further, the lubrication groove has the specified configuration. Thus, superior low friction property can be realized. The reason that the superior low friction property can be realized is that the lubrication groove formed on the surface of the sliding bearing or the thrust receiver can show a superior dynamic pressure effect due to its shape, and further the circulation water is easily supplied to the sliding surface between the sliding bearing and the thrust receiver through the lubrication groove communicating with the inner diameter side and the outer diameter side, so that a lubrication state can be improved. That is, the lubrication groove has both of the dynamic pressure effect and an effect that improves the supplying performance for the circulation water to the sliding surface. Consequently, a simple configuration and a low cost can be realized, compared to the conventional thrust bearing in which a tapered part and a lubrication groove for generating the dynamic pressure are respectively formed.

In particular, in the second invention, the length of the circular arc C along the inner diametrical surface in the lubrication groove is equal to or more than the length of the circular arc D along the outer diametrical surface. Thus, an discharge opening in a flowing direction of the circulation water is equal to or smaller than an inlet opening, so that the dynamic pressure can be further easily generated, compared to the conventional thrust bearing in which the discharge opening is larger than the inlet opening.

Further, the sliding bearing is an injection-molded body of the resin composition and has the lubrication groove on at least one end surface thereof. Further, the weld part is formed within the lubrication groove and is not formed on the land part. Thus, the flatness of the land part can be improved. The improvement of the flatness can reduce noise due to vibration in sliding and can realize superior silent performance.

MODE FOR CARRYING OUT THE INVENTION

A rotor for electric water pumps of the first invention has a main body that supports an impeller of a pump, a sliding bearing that rotatably supports a shaft, and a magnet that is disposed to face a stator. The sliding bearing is an annealing treated body of a PPS resin composition. The PPS resin composition contains 5-30 vol % of carbon fiber, 1-20 vol % of PTFE resin, and 1-30 vol % of graphite relative to the whole volume of the PPS resin composition. The main body is an injection-molded body disposed by insert-molding a thermoplastic resin composition, which is different from the above-described PPS resin composition, at an outer diameter side of the sliding bearing. That is, the main body is insert-molded to be integrated with the outer diameter side of the sliding bearing by injection-filling the thermoplastic resin composition into a main body molding die in a state in which the sliding bearing molded in advance using a specified PPS resin composition and subjected to an annealing treatment is inserted in the molding die.

A temperature pattern of the annealing treatment for the sliding bearing is not especially limited, however the maximum temperature of the annealing treatment is preferably 200-260° C., more preferably 220-260° C., furthermore preferably 220-240° C. It is preferable to keep the maximum temperature within the range of 220-260° C. for more than two hour, more preferably four hours. The residual stress in the sliding bearing is removed by the annealing treatment, and thus an inner diameter contraction amount by the insert-molding can be reduced.

When the Differential Scanning calorimetry (DSC) is executed on the sliding bearing subjected to the annealing treatment, an endothermic peak appears (hereinafter, the endothermic peak is referred to as an endothermic peak due to heat hysteresis). The endothermic peak does not appear in a temperature increasing process of the sliding bearing without the annealing treatment. The endothermic peak due to the heat hysteresis appears in a temperature equivalent to the maximum temperature or a temperature slightly higher (within +20° C.) than the maximum temperature of the annealing treatment. Accordingly, the maximum temperature of the annealing treatment can be assumed. In the sliding bearing of the first invention, the endothermic peak due to the heat hysteresis appears in a range of 200-280° C.

Figure 5:
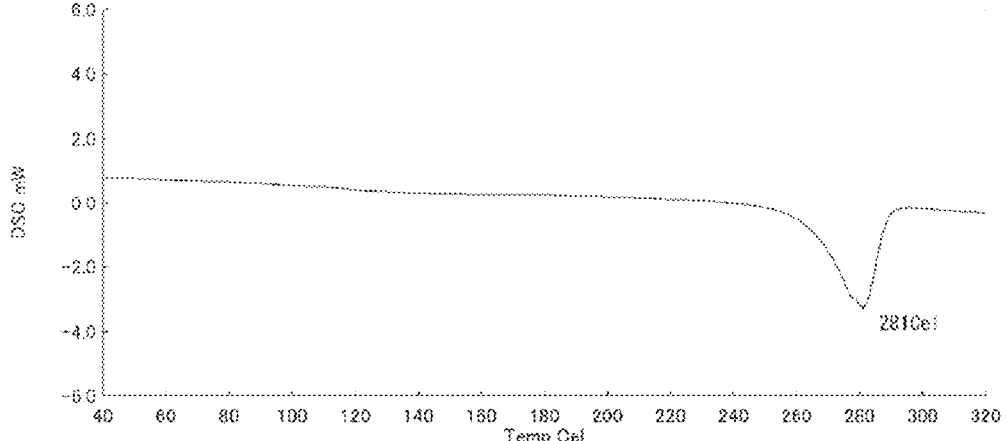
FIG. 5 is a graph showing a DSC chart of a molded body of a PPS resin composition.
Figure 6:
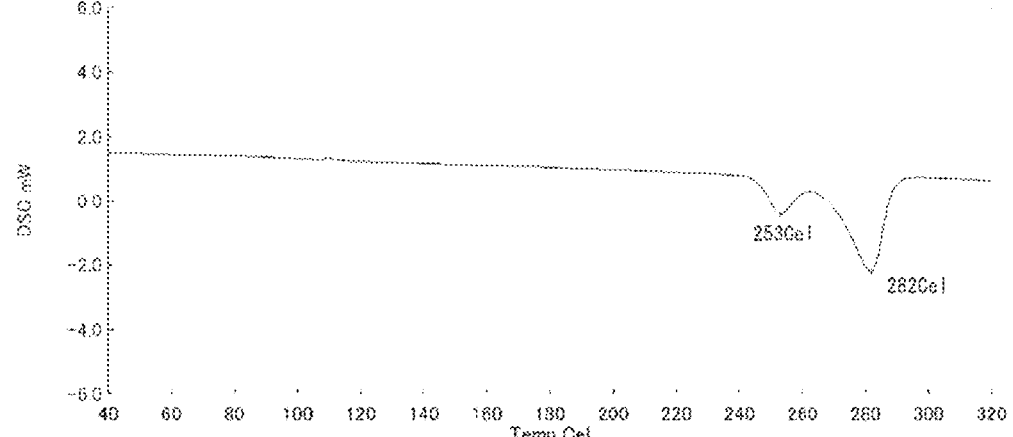
FIG. 6 is a graph showing a DSC chart of an annealing treated body of a PPS resin composition.

FIG. 5 shows one example of a DSC chart in a case in which the molded body of the PPS resin composition used in the first invention is not subjected to the annealing treatment. FIG. 6 shows one example of a DSC chart in a case in which the above-described molded body is subjected to the annealing treatment for four hours at the maximum temperature of 240° C. The endothermic peak due to the heat hysteresis appears at 253° C. in FIG. 6, while the endothermic peak due to the heat hysteresis does not appear in FIG. 5. Each of the endothermic peak at 281° C. in FIG. 5 and the endothermic peak at 282° C. in FIG. 6 is caused by the melting point of the PPS resin. Each of the DSC charts in FIGS. 5 and 6 was measured in nitrogen gas at temperature increasing speed of 15° C./minute.

Figure 1:
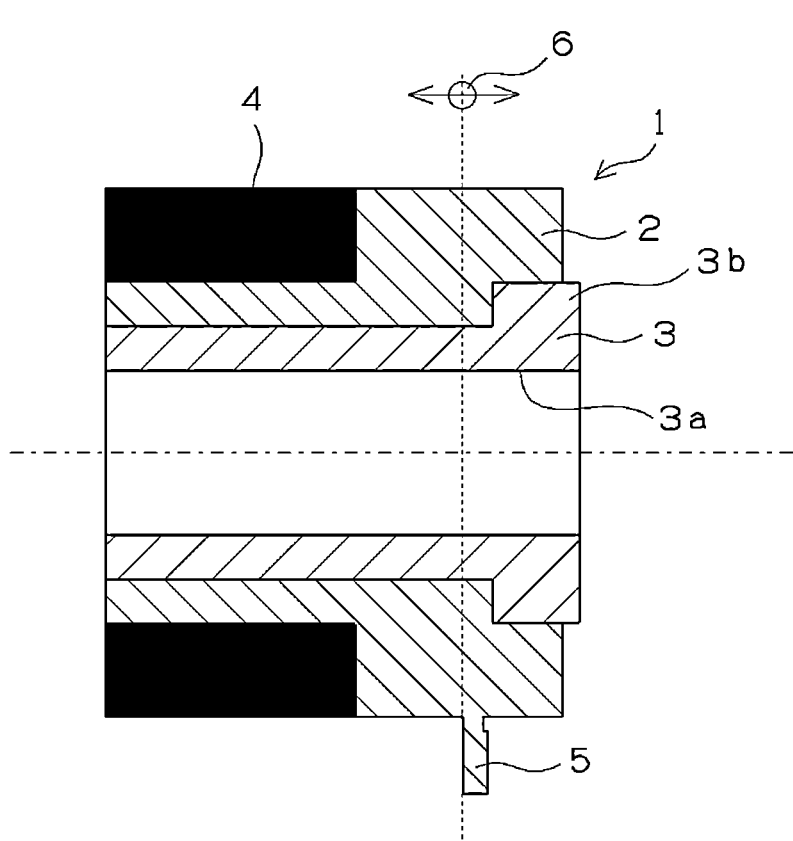
FIG. 1 is an axial sectional view of a rotor for electric water pumps of the first invention.
Figure 4:
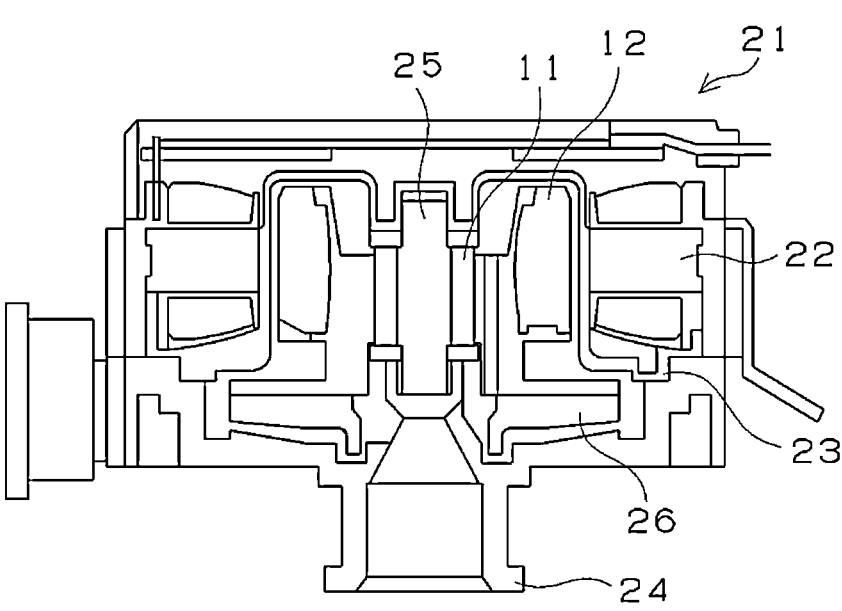
FIG. 4 is a side view showing one example of an electric water pump.

One example of the rotor for electric water pumps of the first invention is described with reference to FIG. 1. FIG. 1 is a sectional view of the rotor for electric water pumps of the first invention. A configuration of an electric water pump to which the rotor is applied is similar to that shown in FIG. 4. That is, the electric water pump includes a shaft serving as a center axis of the rotor, a stator disposed on a circle coaxial to the shaft so as to rotationally drive the rotor, and an impeller for pressure-feeding water. As shown in FIG. 1, a rotor 1 of this example includes a main body 2 that supports the impeller of the pump, a sliding bearing 3 that rotatably supports the shaft, a magnet 4 disposed to face the stator, and an impeller mount part 5.

The sliding bearing 3 is a cylindrical body having a bearing hole 3*a* for rotatably supporting the shaft, at the radially center portion thereof. A cylinder inner surface that forms the bearing hole 3*a* is a radial bearing surface (sliding surface). An outer diametrical shape of the sliding bearing 3 (for example, a rate of a cylinder length to an cylinder outer diameter, or a cylinder wall thickness) is not especially limited and is appropriately set in response to the configuration of the electric water pump. In the first invention, the bending elastic modulus at 130° C. of the molded body of the PPS resin composition used in the sliding bearing is 3,000 MPa or more. Thus, the molded body of the PPS resin composition has superior rigidity at high temperature and can reduce the inner diameter contraction amount in molding the main body. Accordingly, management of a radial gap in any shape of the sliding bearing becomes easy, and superior accuracy of the bearing hole 3*a* can be obtained.

The sliding bearing 3 shown in FIG. 1 has a flange 3*b* on a cylinder end. An end surface of the flange 3*b* axially protrudes from the end surface of the main body 2. When the pump is driven, the impeller is pressed toward one side in the axial direction by differential pressure. At this time, the end surface of the flange 3*b* serves as a thrust bearing surface, which can eliminate the need for arranging another thrust bearing. Further, by forming the flange 3*b* in the sliding bearing 3, the sliding bearing 3 and the main body 2 formed by means of insert-molding at the outer diameter side of the sliding bearing can be firmly coupled, and thus dropping off and rotating therebetween in use can be prevented. Also, in order to strengthen the coupling, a protrusion or an uneven shape may be formed in advance at the outer diameter side of the sliding bearing 3.

The PPS resin composition that forms the sliding bearing 3 contains 5-30 vol % of carbon fiber, 1-20 vol % of PTFE resin, and 1-30 vol % of graphite relative to the whole volume of the PPS resin composition.

The PPS resin composition contains the PPS resin as a main component by 50 vol % or more, preferably 60 vol % or more, relative to the whole volume of the PPS resin composition.

PPS resin is crystalline thermoplastic resin having a polymer structure in which benzene rings are linked by sulfides at the para-position. PPS resin has the melting point of approximately 280° C. and the glass transition temperature (Tg) of 93° C. and has extremely high rigidity, and superior heat resistance, dimensional stability, and wear resistance. There are several types of PPS resin including crosslinked type, semi-crosslinked type, straight chain type, and branched chain type defined by its molecular structure. In the first invention, any type of PPS resin may be employed regardless of the molecular structure and molecular weight thereof.

The above-described PPS resin composition contains preferably 5-30 vol %, more preferably 10-30 vol %, furthermore preferably 10-20 vol % of the carbon fiber relative to the whole volume of the resin composition. In case in which the content of the carbon fiber is less than 5 vol %, a reinforcing effect is not sufficiently obtained and thus the wear resistance is deteriorated, while in a case in which content of the carbon fiber is more than 30 vol %, the cost of the resin composition becomes too high.

It is preferable that the above-described PPS resin composition contains PTFE resin and graphite in addition to the PPS resin and the carbon fiber. The compound rate of the PTFE resin is set to preferably 1-20 vol %, more preferably 3-20 vol %, and further more preferably 5-15 vol % to the whole volume of the resin composition. Further, the compound rate of the graphite is set to preferably 1-30 vol %, more preferably 3-30 vol %, and further more preferably 10-30 vol % to the whole volume of the resin composition.

The elastic modulus of the molded body of the above-described PPS resin composition is improved by compounding the carbon fiber thereto. Any of pitch based carbon fiber and PAN based carbon fiber that are classified based on raw material may be employed. Further, any of milled fiber and chopped fiber may be employed. The average fiber diameter of the carbon fiber is 20 μm or less, preferably 5-15 μm. In a case in which a thick carbon fiber having a diameter of more than 20 μm is employed, extreme pressure is caused, and thus the wear damage of the shaft formed of stainless steel might be large. The average fiber diameter is measured by an electron microscope or an atomic force microscope generally used in the field of the present invention. The average fiber diameter is calculated as a number-average fiber diameter based on the above-described measurement.

Examples of the milled fiber, which is commercially available, employed in the first invention include KRECAM-101S, M-101F, and M-201S produced by Kureha Corporation, DIALEAD K223HM-200 μm and DIALEAD K223HM-50 μm produced by Mitsubishi Chemical Corporation, and HC-600-15M produced by Nippon Graphite Fiber Corporation. Further, examples of the PAN based carbon fiber include BESFIGHT HT M100 160MU and HT M100 40MU produced by Toho Tenax Co., Ltd. and Trayca MLD-30 and MLD-300 produced by Toray Industries, Inc. An example of the chopped fiber of the pitch based carbon includes DIALEAD K223HE produced by Mitsubishi Chemical Corporation. An example of the chopped fiber of the PAN based carbon includes Trayca T010-003 produced by Toray Industries, Inc.

PTFE resin is a solid lubricant that decreases a dynamic friction coefficient of a molded body in a boundary lubrication state such as a water-poor state that cannot cause water film. As the PTFE resin, any of molding powder obtained through a suspension polymerization method, fine powder obtained through an emulsion polymerization method, and recycled PTFE may be employed. In order to stabilize the flowability of the PPS resin composition, it is preferable to employ the recycled PTFE that is hardly fibered by the shearing in molding and hardly increases the melting viscosity. The recycled PTFE denotes heat-treated powder (heat hysteresis has been applied), or powder that has been irradiated with γ rays or electron rays. Examples of the recycled PTFE include powder formed by heat-treating the molding powder or the fine powder, powder formed by irradiating the powder formed by heat-treating the molding powder or the fine powder, with γ rays or electron rays, powder formed by grinding a molding body of the molding powder or the fine powder, powder formed by irradiating the powder formed by grinding a molding body of molding powder or fine powder, with γ rays or electron rays, and powder formed by irradiating the molding powder or the fine powder with γ rays or electron rays.

Examples of the PTFE resin that is commercially available employed in the first invention, include KTL-610, KTL-450, KTL-350, KTL-8N, and KTL-400H produced by KITAMURA LIMITED; Teflon (registered trademark) 7-J and TLP-10 produced by Chemours-Mitsui Fluoroproducts Co., Ltd.; Fluon G163, L150J, L169J, L170J, L172J, and L173J produced by AGC Inc.; Polyflon M-15 and Lubron L-5 produced by DAIKIN INDUSTRIES, LTD.; and Dyneon TF9205 and TF9207 produced by 3M Japan Limited. Further, PTFE resin modified by a perfluoroalkylether group, a fluoroalkyl group, or a side chain group containing other fluoroalkyl may be employed. The PTFE resin irradiated with γ rays or electron rays among the PTFE resins described above corresponds to KTL-610, KTL-450, KTL-350, KTL-8N, and KTL-8F produced by KITAMURA LIMITED; and Fluon L169J, L170J, L172J, and L173J produced by AGC Inc.

The graphite is a solid lubricant that decreases, similar to the PTFE resin, a dynamic friction coefficient of the molded body in a boundary lubrication state. The graphite has an advantage that improves a wear property and elastic modulus of the sliding bearing and also improves dimensional accuracy of the sliding bearing in injection molding. Any of natural graphite and artificial graphite may be employed as the graphite. A shape of a particle may be a scaly shape, a spherical shape, or the like. The scaly shape is more preferable because the particle having the scaly shape is hardly dropped off in sliding. An example of the natural graphite includes ACP produced by Nippon Graphite Industries, Co., Ltd. Examples of the artificial graphite include KS-6, KS-25, and KS-44 produced by Imerys Graphite & Carbon Japan Ltd.

A well-known additive for resin may be compounded into the above-described PPS resin composition to such an extent that does not deteriorate an advantage of the present invention. Examples of the additive include a friction property improving agent such as boron nitride, molybdenum disulfide, and tungsten disulfide, and a coloring agent such as carbon black, iron oxide, and titanium oxide.

After the materials that forms the above-described PPS resin composition are mixed as needed using a Henschel mixer, a ball mixer, a ribbon blender or the like, the materials are melt-kneaded using a melt extruder such as a twin-screw melt extruder to obtain molding pellets. Further, during melt-kneading in a twin-screw melt extruder or the like, a side feed may be employed for charging the filling material. The molded body of the PPS resin composition is obtained by means of injection molding using these molding pellets.

Relating to the physical property of the molded body of the above-described PPS resin composition, the bending elastic modulus is preferably 3,000 MPa or more at 130° C. By setting the bending elastic modulus in such a range, the inner diameter contraction amount of the sliding bearing can be reduced when injection-molding the main body using the thermoplastic resin composition. The bending elastic modulus is set to more preferably 3,000-9,000 MPa, further more preferably 4,000-7,000 MPa. The bending elastic modulus is measured by a three-point bending test with a span length of 50 mm and a crosshead speed of 1.3 mm/minute using a test piece (127 mm×12.7 mm×thickness of 3.1 mm) based on ASTM D790.

The sliding bearing is obtained by applying the annealing treatment to the molded body of the PPS resin composition.

The main body is obtained by injection-filling the thermoplastic resin composition into a main body molding die in a state in which the obtained sliding bearing is inserted into the molding die. Further, the main body may be injection-molded in a state in which the magnet is also inserted into the molding die. A condition of the injection molding method (insert molding method) is not especially limited, and thus a known method and a known condition may be employed.

An example of a main component of the thermoplastic resin composition that forms the main body includes synthetic resin such as PEEK resin, PPS resin, polyamide-imide (PAI) resin, polyamide (PA) resin, polybutylene terephthalate (PBT) resin, polyethylene terephthalate (PET) resin, and polyethylene (PE) resin. Any one of these resins may be employed alone, or alternatively a polymer alloy in which two or more of them are mixed may be employed.

The electric water pump may use an antifreeze solution in the alternative to water, as liquid to be fed. From a viewpoint of chemical resistance to the antifreeze solution, crystalline resin is more preferable than amorphous resin, as a main component of the thermoplastic resin composition. Specifically, PPS resin is preferable. The PPS resin has superior heat resistance and thus keeps high rigidity even when the temperature of water or the antifreeze solution rises. Further, the PPS resin has a low water absorption property and thus a dimensional change in use is extremely small.

It is preferable to compound a compounding material into the thermoplastic resin composition that forms the main body. For example, a reinforcing material such as glass fiber, carbon fiber, whisker, mica, and talc may be compounded in order to enhance strength, elasticity, and dimensional accuracy, and an inorganic filling material such as mineral, calcium carbonate, and glass beads may be compounded in order to eliminate anisotropy of contraction in injection molding.

A PPS resin composition that employs the PPS resin composition as a base resin and contains 10-30 vol % of the glass fiber relative to the whole volume of the PPS resin composition is the most preferable.

Relating to the shape of the main body, in the example shown in FIG. 1, the impeller mount part 5 is integrated with the main body 2 of the rotor 1. However, the first invention is not limited to such a shape. For example, a configuration in which the whole of the impeller is integrally formed with the main body may be employed.

Figure 7:
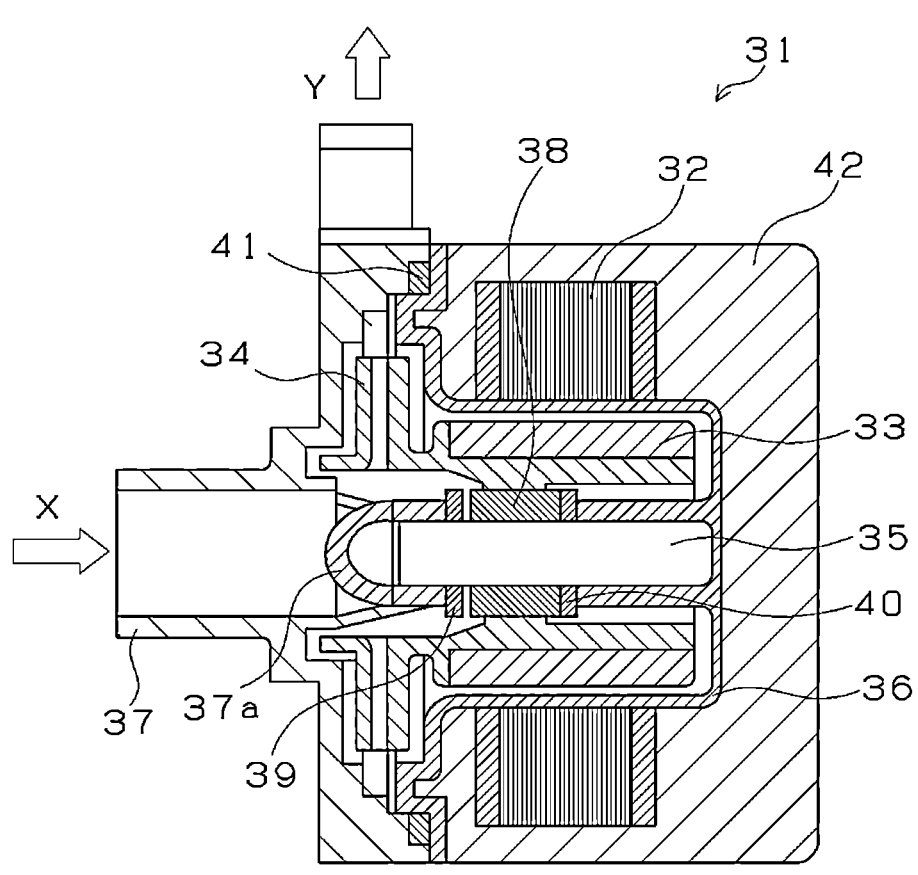
FIG. 7 is a side sectional view of a water pump including a sliding bearing device of the second invention.

One example of a water pump including a sliding bearing device of the second invention is now described with reference to FIG. 7. As shown in FIG. 7, in a water pump 31, a casing 36 and a cover 37 are fixed to each other so as to form a pump chamber that houses an impeller 34. The casing 36 and the cover 37 are sealed by a packing 41 to prevent circulation water in the pump chamber from leaking. A motor 42 includes a winding 32 disposed as a coil to generate a magnetic field, and a controller controls the generation of the magnetic field. The impeller 34 to which a permanent magnet 33 is fixed is rotatably supported on a shaft 35 within the pump chamber to follow the generated magnetic field. When the impeller 34 is rotated within the pump chamber in response to the rotating magnetic field, the circulation water is sucked and discharged. Specifically, the impeller 34 is rotated by the attraction and repulsion of the fixed permanent magnet 33 in response to the rotating magnetic field generated by the winding 32. Thus, a pump action is generated to suck the circulation water from a direction shown by an arrow X and discharge the circulation water toward a direction shown by an arrow Y.

The shaft 35 is fixed at a generally center portion of the casing 35 and supported by a shaft supporter 37a of the cover 37. The impeller 34 is rotatably supported on the shaft 35 via a cylindrical sliding bearing 38 fixed to the center of the impeller 34. The shaft 35 is a fixed (non-rotatable) shaft. Thus, an outer diametrical surface of the shaft 35 and an inner diametrical surface of the sliding bearing 38 rotationally slide to each other. Both end surfaces of the sliding bearing 38 rotationally slide about a thrust direction on thrust plates 39, 40 serving as thrust receivers disposed between the shaft supporter 37a of the cover 37 and the sliding bearing 38 and between the casing 36 and the sliding bearing 38, respectively. The "sliding bearing" is a component configured to slide by receiving a load on an inner diametrical surface and an end surface. The sliding bearing need not necessarily be one single component, and thus may be formed by two or more components, which may be formed of different materials.

In the water pump of the second invention, a lubrication groove is disposed for discharging the circulation water from the inner diameter side to the outer diameter side of the sliding bearing 38 using relative rotation between the thrust receiver (the thrust plates 39, 40) and the sliding bearing 38 in rotating of the impeller 34. The lubrication groove is formed on the thrust sliding surface of at least one of the end surface of the sliding bearing 38 at the circulation water discharging side and the thrust receiver (the thrust plate 39 or 40) sliding on the end surface of the sliding bearing 38.

Figure 8:
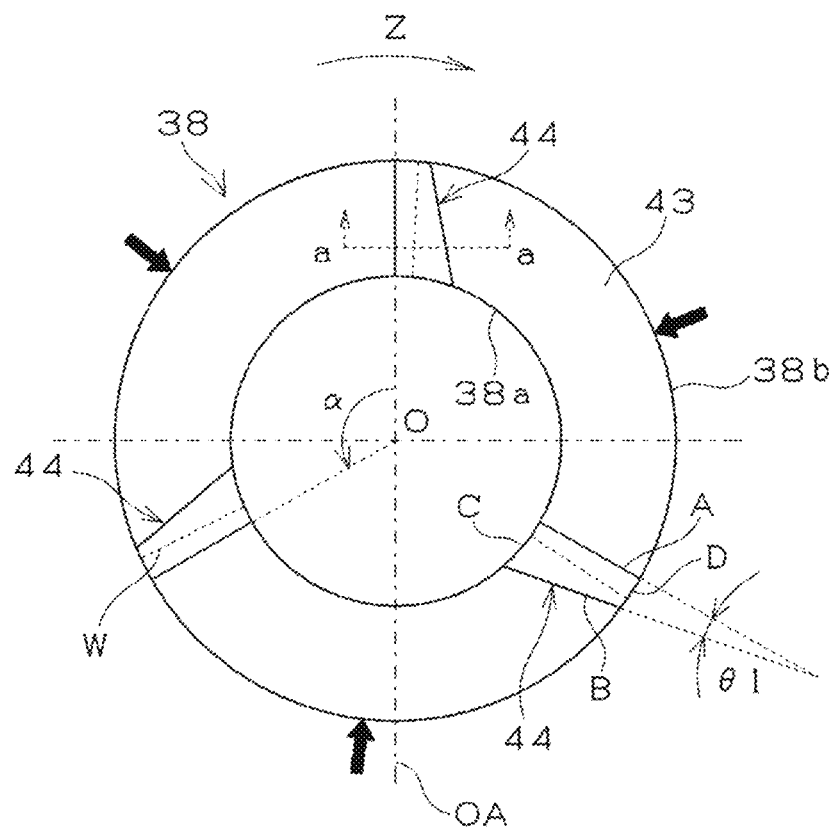
FIG. 8 is a projection view of an end surface of a sliding bearing of the second invention, seen from a front side thereof.

In the example shown in FIG. 7, the impeller 34 is pushed to the side of the cover 37 by the differential pressure in rotating so that the one end surface of the sliding bearing 38 and the thrust plate 39 rotationally slide to each other. The other end surface of the sliding bearing 38 and the thrust plate 40 at the side of the casing 36 hardly slide to each other. A flowing direction of water caused by the differential pressure is a direction from the side of the thrust plate 40 toward the side of the thrust plate 39. In the example shown in FIG. 7, the lubrication groove is formed on the end surface of the sliding bearing 38 sliding on the thrust plate 39. FIG. 8 shows a projection view of this end surface seen from the front side thereof.

As shown in the projection view (plane view) of FIG. 8, the sliding bearing 38 includes a land part 43 serving as a sliding surface, and a lubrication groove 44 that communicates an inner diametrical surface 38*a* and an outer diametrical surface 38*b* to each other. The land part 43 is formed by the residual part in the sliding bearing 38 other than lubrication groove 44, and other groove or recess is not formed on an end surface of the bearing. An arrow Z in FIG. 8 shows a rotational direction of the sliding bearing 38.

As shown in FIG. 8, the lubrication groove 44 has a groove bottom surface 44*a* (see FIG. 9) inclined to the land part 43 to generate dynamic pressure using the relative rotation between the sliding bearing 38 and the thrust receiver. Three lubrication grooves 44 are formed on the end surface of the bearing at any intervals therebetween in a circumferential direction. The lubrication grooves 44 are preferably arranged at the same intervals in the circumferential direction. In the example shown in FIG. 8, an angle between the adjacent grooves is 120 degrees. This angle is between lines A of the adjacent grooves 44. However, the number of the lubrication grooves 44 is not especially limited. As the number of the lubrication grooves 44 is larger, the dynamic pressure effect is greater, however since the surface pressure on the sliding surfaces of the sliding bearing 38 and the thrust receiver becomes large, the number of the lubrication grooves 44 is set based on the use condition or the like.

An extension line of the line A of the lubrication groove 44 passes the axial center O of the sliding bearing 38. In this case, each of the lubrication grooves 44 is arranged to be offset toward a downstream side in the rotational direction relative to the center line OA including the line A of the sliding bearing 38.

As shown in FIG. 8, each of the lubrication grooves 44 is formed by a region surrounded by: the line A extending from the inner diameter side to the outer diameter side on the end surface of the bearing; a line B disposed at the downstream side in the rotational direction of the sliding bearing 38 relative to the line A, the line B extending from the inner diameter side to the outer diameter side on the end surface of the bearing; a circular arc C along the inner diametrical surface 38*a*; and a circular arc D along the outer diametrical surface 38*b*. In the sliding bearing 38 shown in FIG. 8, the length of the circular arc C is longer than the length of the circular arc D. When the sliding bearing 38 is rotating, the circulation water is discharged from the inner diameter side to the outer diameter side. The lubrication groove 44 is formed in a tapered shape along the flowing direction of the circulation water, so that the dynamic pressure effect can be enhanced. The ratio of the length of the circular arc C and the length of the circular arc D is set to $\frac{1}{3} \le$ (Length of Circular arc D)/(Length of Circular arc C)$\le 1$. Thus, it is preferable that the length of the circular arc D is shorter than the length of the circular arc C.

Further, it is preferable that an area of the opening of the lubrication groove 44 at the inner diameter side is equal to or larger than an area of the opening of the lubrication groove 44 at the outer diameter side. The "area of the opening at the inner diameter side" is calculated based on an arrow view when the inner diameter side is seen along the line A from the center line OA of the sliding bearing. Further, the "area of the opening at the outer diameter side" is calculated based on an arrow view when the center line OA is seen along the line A from the outer diameter side.

In the example shown in FIG. 8, an angle θ1 denotes an angle between the line A and the line B of the lubrication groove 44. More specifically, the angle θ1 denotes the sharp angle (0-90 degrees) between the extension line of the line A and the extension line of the line B. As the angle θ1 is larger, the dynamic pressure effect is greater, however since the surface pressure becomes larger, the angle θ1 is preferably set in a range of 0-15 degrees. In the example shown in FIG. 8, the line A and the line B are not in parallel to each other, and thus the angle θ1 is larger than 0 degree. In this configuration, the angle θ1 is more preferably 5-15 degrees, further more preferably 10-15 degrees.

Further, as described in the following example, the line A and the line B may be in parallel to each other (the angle θ1 is 0 degree). Also in such a case, the length of the circular arc C is longer than the length of the circular arc D.

Figure 9:
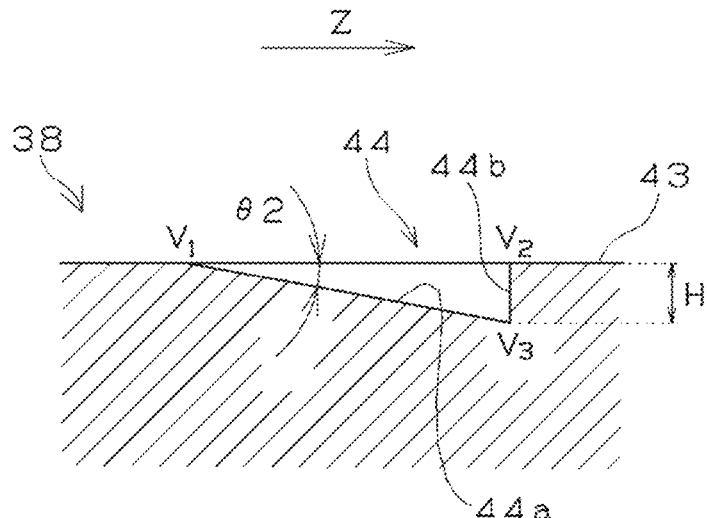
FIG. 9 is a sectional view showing a sectional shape of a lubrication groove.

Next, FIG. 9 shows a sectional view taken along line a-a in FIG. 8. FIG. 9 is a sectional view of the lubrication groove cut by a plane orthogonal to the line A. As shown in FIG. 9, the sectional shape of the lubrication groove 44 is a right triangle. The right triangle has apexes of an intersection point $v_1$ between the line A and the cutting plane, an intersection point $v_2$ between the line B and the cutting plane and an intersection point $v_3$ between the groove bottom surface 44*a* and a groove side surface 44*b*. A hypotenuse of the right triangle corresponds to the groove bottom surface 44*a* of the lubrication groove 44. The groove bottom surface 44*a* is an inclined surface inclined to the land part 43. The groove depth becomes smaller toward an upstream side in a rotational direction Z. When the sliding bearing 38 is rotating, the circulation water supplied into the lubrication groove 44 is pressed toward the intersection point $v_1$. Thus, the lubrication groove 44 having such a configuration generates the dynamic pressure due to the circulation water.

An inclined angle θ2 of the groove bottom surface 44*a* to the land part 43 (an inner angle relating to an apex defined by the intersection point $v_1$) is preferably 3-30 degrees. In a case in which the angle θ2 is less than 3 degrees, a flow amount of the circulation water passing the lubrication groove is reduced, and thus the circulation water might not be supplied sufficiently to the sliding surfaces of the sliding bearing and the thrust receiver. In a case in which the angle θ2 is more than 30 degrees, the dynamic pressure effect might be insufficient. The angle θ2 is more preferably 5-20 degrees. The angle θ2 may be constant or may be continuously changed from the inner diameter side toward the outer diameter side. In a case in which the angle θ2 is changed, the angle θ2 in any section is preferably 3-30 degrees, more preferably 5-20 degrees.

The maximum depth H of the lubrication groove 44 in the axial direction of the sliding bearing 38 is preferably 0.1-1.0 mm. The maximum depth H is a depth of a deepest part of the lubrication groove 44 from the land part 43. In a case in which the maximum depth H is less than 0.1 mm, the flow amount of the circulation water passing the lubrication groove 44 is reduced, and thus the circulation water might not be supplied sufficiently to the sliding surfaces of the land part 43 in the end surface and the thrust receiver. In a case in which the maximum depth H is more than 1.0 mm, the dynamic pressure effect caused by the circulation water pressed toward the intersection point $v_1$ might be insufficient. In the example shown in FIG. 9, the deepest part of the lubrication groove 44 is linearly formed from the inner diameter side toward the outer diameter side. The groove depth of the lubrication groove 44 may be changed from the inner diameter side toward the outer diameter side. In such a case, the maximum depth H is preferably in a range of 0.1-1.0 mm.

For example, in a case in which: the maximum depth H of the lubrication groove 44 is constant from the inner diameter side toward the outer diameter side; the sectional shape of the lubrication groove 44 is a right triangle; and the angle θ1 (see FIG. 8) is not 0 degree, the angle θ2 is continuously increased from the inner diameter side toward the outer diameter side.

In the example shown in FIG. 9, the sectional shape of the lubrication groove 44 is a right triangle, however the sectional shape of the lubrication groove 44 may be a substantially right angled triangle. For example, a hypotenuse that forms the groove bottom surface 44a or a side that forms the groove side surface 44b may be slightly curved to such an extent that does not deteriorate an advantage of the second invention. An inner angle at the intersection point $v_2$ between the line B and the cutting plane may be set to 70-90 degrees (preferably 80-90 degrees). It is preferable to set the groove side surface 44b to be nearly orthogonal to the land part 43. Further, a chamfered part or a round R may be disposed on the intersection point $v_2$.

Figure 10:
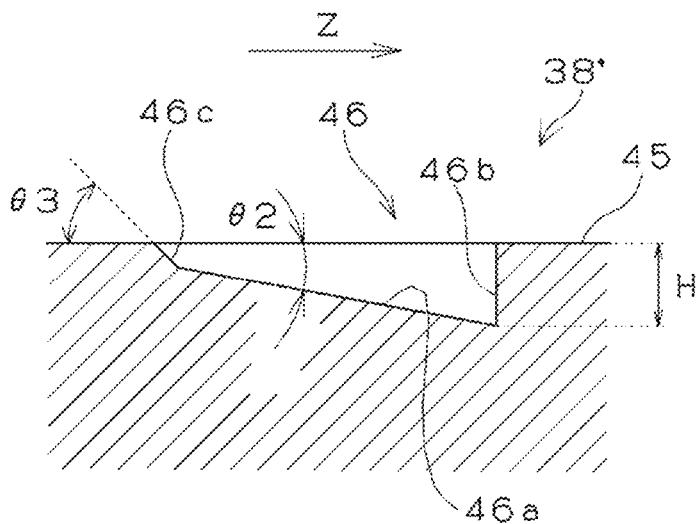
FIG. 10 is a sectional view showing another example of the sliding bearing of the second invention.

FIG. 10 shows another example of the sliding bearing of the second invention. Similar to FIG. 9, FIG. 10 shows a sectional view of the lubrication groove cut by a plane orthogonal to the line A. As shown in FIG. 10, an inclined surface 46c having a gradient steeper than a groove bottom surface 46a is formed on a boundary between an end portion of the groove bottom surface 46a at an upstream side in a rotational direction Z and a land part 45. In this case, a locus of the end portion of the inclined surface 46c at the upstream side in the rotational direction Z defines the line A. In this example, an inclined angle θ3 of the inclined surface 46c to the land part 45 is larger than an angle θ2. For example, the angle θ3 is 20-90 degrees, preferably 40-60 degrees. In a case in which the angle θ3 is less than 20 degrees, a change in area of the land part 45 becomes large when the land part 45 is worn, and thus a desired effect might not be obtained.

Figure 11:
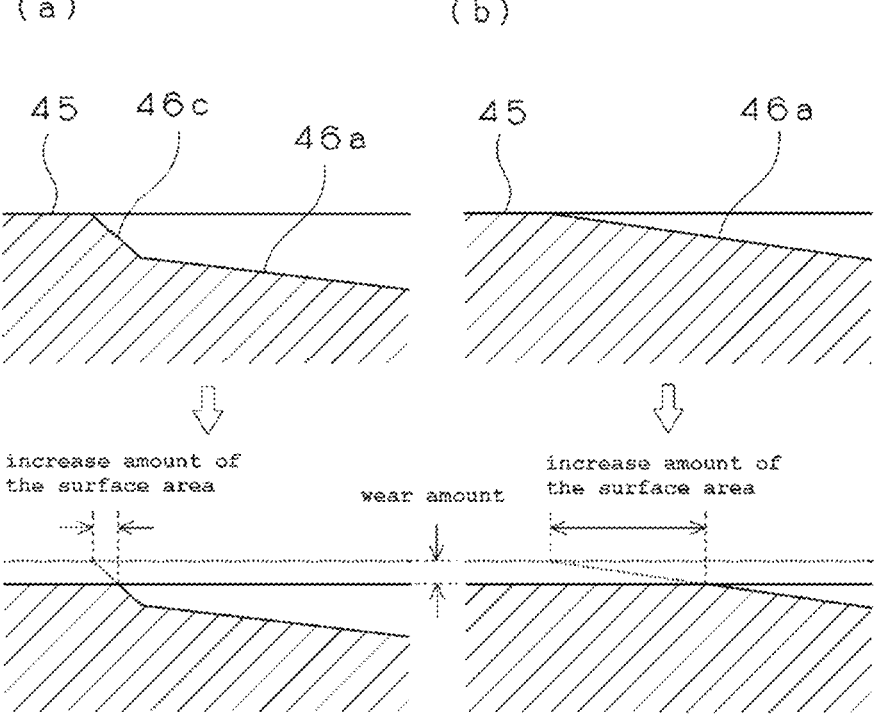
FIGS. 11(*a*) and 11(*b*) are sectional views each showing a change of a sliding surface caused by wear.

Next, FIGS. 11(*a*) and 11(*b*) show an effect caused by the configuration shown in FIG. 10. As shown in FIG. 11 (*a*), in the sliding bearing, the inclined surface 46c having a gradient steeper than the groove bottom surface 46a is formed on the boundary between the groove bottom surface 46a and the land part 45 (sliding surface), and thus an increase amount of the surface area of the sliding surface is small when the sliding surface is worn, compared to a configuration without the inclined surface (see FIG. 11(*b*)). Consequently, the change of the torque can be suppressed.

In the second invention, the material of the sliding bearing is not especially limited and thus may employ synthetic resin, carbon material, metal or the like. Of these materials, the synthetic resin is preferable. Thermoplastic resin is more preferably because of its superior moldablity. In particular, the sliding bearing is preferably an injection-molded body of a resin composition including the thermoplastic resin. In the injection-molding, at least one gate is disposed on an outer diametrical surface of the sliding bearing, and the melted resin composition enters a cavity through the gate. In a case in which multiple gates are employed, the gates are preferably disposed at the same intervals in the circumferential direction.

Positions of the gates are now described with reference to FIG. 8. The sliding bearing 38 shown in FIG. 8 is an injection-molded body formed by means of injection-molding using gates shown by black arrows at three positions (three gates). The sliding bearing 38 has gate marks on the outer diametrical surface. The interval between the gates is set to correspond to 120 degrees in the circumferential direction. The position of the gate is not especially limited, however it is preferable that a weld part W is formed within the lubrication groove 44 and is not on a portion (the land part 43) other than the lubrication groove 44 as shown in FIG. 8. The weld part W is formed near the intermediate portion of the adjacent gates. Thus in the example shown in FIG. 8, each of the positions of the gates is set such that the three weld parts W are formed within the three lubrication grooves 44, respectively.

The weld part is formed at a confluent position of the melted resin. The welt part might protrude from a portion where the weld part is not formed. Thus, a flatness of the land part 43 on an end surface can be improved by not forming the weld part on the land part 43. In a case in which the protrusion due to the weld part expands around the weld part, the whole of the weld part need not be necessarily accommodated within the lubrication groove. The position of the weld part can be checked through a known method such as microscope observation. In the sliding bearing 38, the position of the gate in the axial direction is not especially limited, however it is preferable that the gate is formed near the center of the sliding bearing 38 in the axial direction.

The flatness of the land part 43 is preferably 0.08 mm or less, more preferably 0.05 mm or less. The flatness is defined by JIS B0621-1984. Examples of a method for measuring the flatness include a contact-type measurement using a dial gauge, and a non-contact-type measurement using height information obtained by irradiation of laser beam. By improving the flatness of the flat part (the land part 43) except the lubrication groove 44 on the end surface of the sliding bearing 38, the vibration caused when sliding can be reduced.

In the sliding bearing of the second invention, it is preferable to form a groove on a radial sliding surface of the inner diametrical surface, in addition to the above-described end surface, of the sliding bearing. For example, a linear groove parallel to the axial direction, or a spiral groove may be formed. This groove is preferably formed as a dynamic pressure groove. By forming the dynamic pressure groove, water can be pressed onto the closed sliding surface so that much water can be supplied. Thus, a load in a reaction direction is generated, and water film is formed, which realizes a low friction coefficient. An air-cooling effect can be realized even in an abnormal state such as a water-poor state. The above-described spiral groove may be formed such that a spiral rotating direction matches with a rotational direction of the shaft so as to easily generate the dynamic pressure. This groove is preferably formed by both of a communication groove (a groove communicating with one end surface and the other end surface) and a non-communication groove.

The resin composition in a case in which the sliding bearing is an injection-molded body is now described. The base resin of the resin composition is preferably thermoplastic resin. A kind of the thermoplastic resin is not especially limited, however it is preferable to employ engineering plastic or super engineering plastic from a viewpoint of heat resistance and chemical resistance. Specifically, examples of the base resin include polyphenylene sulfide (PPS) resin, polyether ether ketone (PEEK) resin, polyether sulfone resin, polyether-imide resin, polyamide resin, thermoplastic polyimide resin, and polyamide-imide resin. Of these resins, PPS resin or PEEK resin is preferable because of its superior chemical resistance and a low water absorption property. The PPS resin is especially preferable from a viewpoint of cost. By using the resin composition containing PPS resin as a base resin, a sliding bearing can be provided at a low cost.

PPS resin is crystalline thermoplastic resin having a polymer structure in which benzene rings are linked by sulfides at the para-position. PPS resin has the melting point of approximately 280° C. and the glass transition temperature (Tg) of 93° C. and has extremely high rigidity, and superior heat resistance, dimensional stability and wear resistance. There are several types of PPS resin including crosslinked type, semi-crosslinked type, straight chain type, and branched chain type defined by its molecular structure. In the second invention, any type of PPS resin may be employed regardless of the molecular structure and molecular weight thereof.

PEEK resin is crystalline thermoplastic resin having a polymer structure in which benzene rings are linked to a carbonyl group by ethers at the para-position. PEEK resin has the melting point of approximately 340° C. and the glass transition temperature of 143° C. and has superior heat resistance, creep resistance, load resistance, wear resistance, sliding property, fatigue property, and moldablity.

In order to impart the friction property in a water-poor state that cannot cause water film, to the above-described resin composition, it is preferable to compound polytetrafluoroethylene (PTFE) resin into the resin composition. Further, in order to impart the friction property in the circulation water to the above-described resin composition, it is preferable to compound graphite into the resin composition. The graphite also has an effect that improves the dimensional accuracy of the sliding bearing during the injection-molding. The flatness of the land part can be also improved by compounding the graphite.

As the PTFE resin, any of molding powder obtained through a suspension polymerization method, fine powder obtained through an emulsion polymerization method, and recycled PTFE may be employed. In order to stabilize the flowability of the resin composition, it is preferable to employ the recycled PTFE that is hardly fibered by the shearing in molding and hardly increases the melting viscosity. The recycled PTFE denotes heat-treated powder (heat hysteresis has been applied), or powder that has been irradiated with γ rays or electron rays. Examples of the recycled PTFE include powder formed by heat-treating the molding powder or the fine powder, powder formed by irradiating the powder formed by heat-treating the molding powder or the fine powder, with γ rays or electron rays, powder formed by grinding a molding body of the molding powder or the fine powder, powder formed by irradiating the powder formed by grinding a molding body of molding powder or fine powder, with γ rays or electron rays, and powder formed by irradiating the molding powder or the fine powder with γ rays or electron rays. The PTFE resin exemplarily described in the first invention is employed, as needed, as the PTFE resin, which is commercially available, to be employed in the second invention.

Any of natural graphite and artificial graphite may be adopted as the graphite. A shape of a particle may be a scaly shape, a spherical shape, or the like. The scaly shape is more preferable because the particle is hardly dropped off in sliding. An example of the natural graphite includes ACP produced by Nippon Graphite Industries, Co., Ltd. Examples of the artificial graphite include KS-6, KS-25, and KS-44 produced by Imerys Graphite & Carbon Japan Ltd.

In order to improve the rigidity, the wear resistance, and the dimensional accuracy of the sliding bearing, it is preferable to compound carbon fiber into the above-described resin composition. Any of pitch based carbon fiber and PAN based carbon fiber that are classified based on raw material may be employed. The average fiber diameter of the carbon fiber is 20 μm or less, preferably 5-15 μm. In a case in which a thick carbon fiber having a diameter of more than 20 μm is employed, extreme pressure is easily caused and an effect for improving the load resistance is inferior. Thus, in a case in which the mating material such as the rotational shaft and the thrust receiver is formed of stainless steel, the wear damage of the mating material might be large.

Any of milled fiber and chopped fiber may be employed as the carbon fiber. The milled fiber having the fiber length of 1 mm or less is preferable, and the average fiber length of 20-200 μm is more preferable. In a case in which the average fiber length is less than 20 μm, sufficient rigidity and a reinforcing effect are hardly obtained, and the wear resistance might be inferior. In a case in which the average fiber length is more than 200 μm, extreme pressure is easily caused, and in a case in which the mating material such as the rotational shaft and the thrust receiver is formed of stainless steel, the wear damage of the mating material might be large. The average fiber diameter is measured by an electron microscope or an atomic force microscope generally used in the field of the present invention. The average fiber diameter is calculated as a number-average fiber diameter based on the above-described measurement. The milled fiber or the chopped fiber exemplarily described in the first invention is employed, as needed, as the milled fiber or the chopped fiber, which is commercially available, to be employed in the second invention.

A well-known additive for resin may be compounded into the above-described resin composition to such an extent that does not deteriorate an advantage of the present invention. Examples of the additive include a friction property improving agent such as boron nitride, molybdenum disulfide, and tungsten disulfide, and a coloring agent such as carbon black, iron oxide, and titanium oxide.

The compound rate of at least the PTFE resin and/or the graphite in the resin composition is 3-30 vol %, preferably 5-20 vol %. The compound rate of the carbon fiber in the resin composition is 5-30 vol %, preferably 10-20 vol %. Further, the residual part in the resin composition is preferably a base resin. It is preferable to employ both of the PTFE resin and the graphite.

After the materials that forms the above-described resin composition are mixed as needed using a Henschel mixer, a ball mixer, a ribbon blender or the like, the materials are melt-kneaded using a melt extruder such as a twin-screw melt extruder to obtain molding pellets. Further, during melt-kneading in a twin-screw melt extruder or the like, a side feed may be employed for charging the filling material. The sliding bearing is obtained by means of injection molding using these molding pellets.

In the sliding bearing device of the second invention, the material of the thrust receiver is not especially limited, however metal is preferably employed and stainless steel is more preferably employed. A known coating such as a coating of DLC (Diamond-Like-Carbon) or a resin coating may be applied to a surface of the thrust receiver.

In each of the examples shown in FIG. 7 to FIGS. 11(a) and 11(b), the lubrication groove that discharges liquid and generates the dynamic pressure is formed on the end surface of the sliding bearing, however in the alternative or in addition to this configuration, a similar lubrication groove may be formed on the sliding surface of the thrust receiver. Further, the circulation water in the water pump is not limited to water, and therefore an antifreeze solution or a chemical solution may be suitably used.

EXAMPLES

Examples A1 to A4 and Comparative Examples A1 to A3

Figure 2:
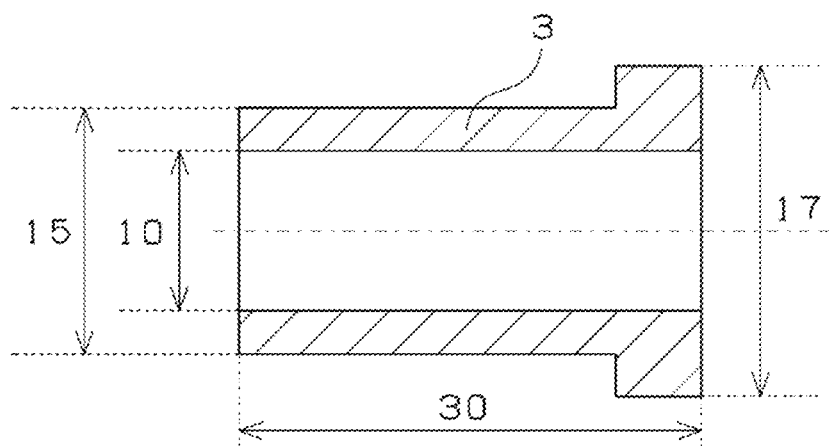
FIG. 2 is an axial sectional view showing dimensions of a sliding bearing of the rotor in an example of the first invention.
Figure 3:
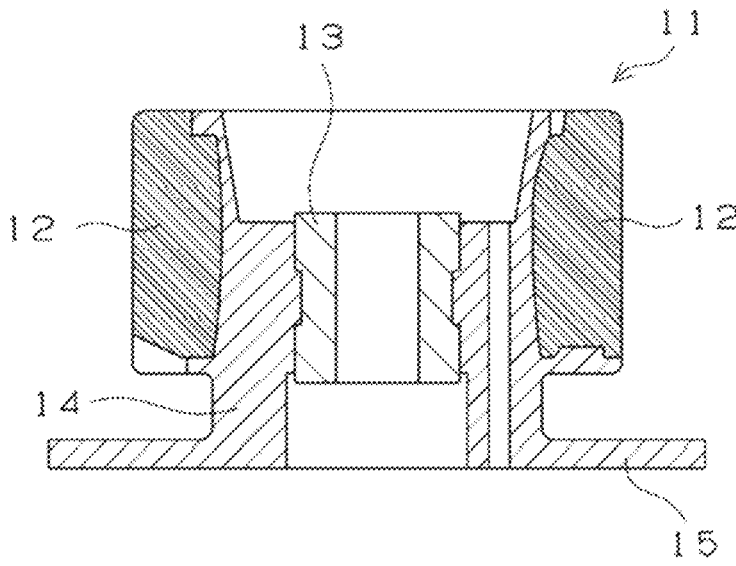
FIG. 3 is an axial sectional view of a conventional rotor for electric water pumps.

The raw materials of the resin composition used in Examples A1 to A4 and Comparative examples A1 to A3 are collectively described below.
(1) Polyphenylene Sulfide Resin (PPS)
 Tosoh Corporation: B-042
(2) Carbon Fiber (CF)
 Kureha Corporation: KRECA M-107T (average fiber length: 0.4 mm, average fiber diameter: 18 μm)
(3) PTFE Resin (PTFE)
 KITAMURA LIMITED: KTL-610 (recycled PTFE)
(4) Graphite (GRP)
 Imerys Graphite & Carbon Japan Ltd.: KS-25 (artificial graphite, scaly shape)
The PPS resin compositions of Examples A1 to A4 and Comparative examples A1 to A3 are shown in Table 1. The sliding bearing having the dimensional shape shown in FIG. 2 is produced by injection-molding the PPS resin composition and applying the annealing treatment thereto. The unit of the dimensional numeral in FIG. 2 is millimeter. The obtained sliding bearing (the dimensional shape shown in FIG. 2) is inserted together with the magnet into the molding die, and then the main body is injection-molded using the PPS resin (74 vol %) containing glass fiber (26 vol %) to produce the rotor shown in FIG. 1. The reference numeral 6 in FIG. 1 denotes a parting line (PL) of the molding die. The inner diameter size of the sliding bearing was measured using a pin gauge (the diameter of the pin gauge penetrates the sliding bearing is the inner diameter size) before and after the insert molding. A calculated result of the inner diameter contraction amount is shown in the lowest field of Table 1.

smaller than that of Comparative example A1 (no annealing treatment). The deformation of the bearing of Comparative example A2 (the sliding bearing for which the annealing temperature is 275° C.) was too large after the annealing treatment, so that the insert molding was incapable and thus the injection molded body was not obtained. Consequently, the inner diameter contraction amount of Comparative example A2 was not measured. The inner diameter contraction amount of Comparative example A3 (the sliding bearing having the elastic modulus of 2,000 MPa before the annealing treatment) is twice as large as those of Examples A1 to A3.

Examples B1 to B11 and Comparative Examples B1 and B2

Figure 12:
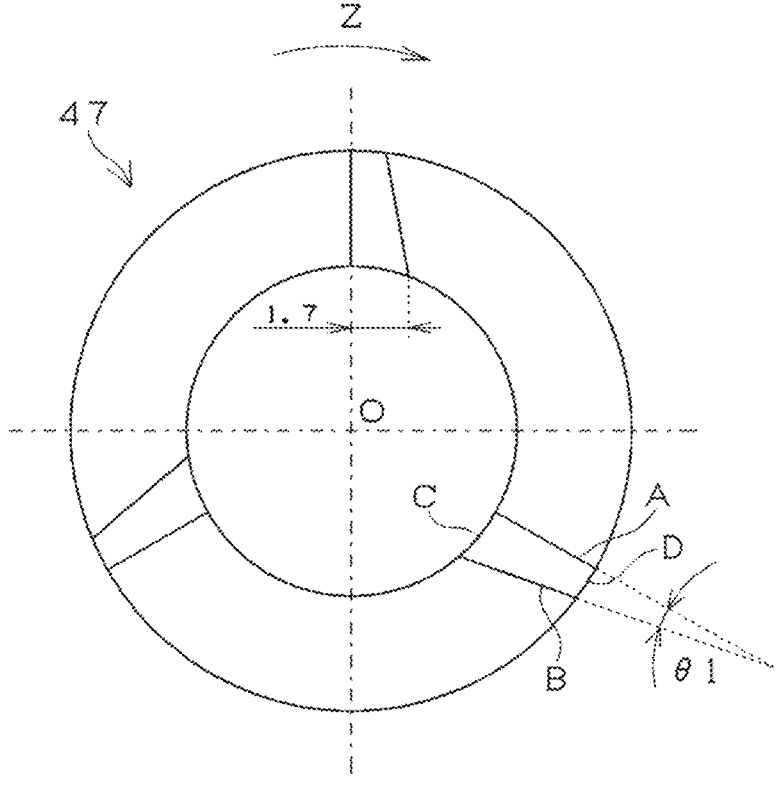
FIG. 12 is a projection view of an end surface of a specimen of each of Examples B1 to B4, seen from a front side thereof.

Cylindrical specimens (an inner diameter of 10 mm, an outer diameter of 17 mm and a height of 13 mm) of Examples B1 to B11 and Comparative examples B1 and B2 were produced by injection-molding the resin composition containing the PPS resin as a base resin. The resin composition contains 5 vol % of PTFE resin, 15 vol % of graphite, 10 vol % of carbon fiber, and a residual component of PPS resin. The details of the materials are as below.
{PPS Resin}
 Tosoh Corporation: B-042
(PTFE Resin)
 KITAMURA LIMITED: KTL-610 (recycled PTFE)
(Carbon Fiber)
 Kureha Corporation: KRECA M-107T (average fiber length: 0.4 mm, average fiber diameter: 18 μm)
(Graphite)
 Imerys Graphite & Carbon Japan Ltd.: KS-25 (artificial graphite, scaly shape)
FIG. 12 shows a projection view of an end surface of the cylindrical specimen of each of Examples B1 to B4, seen from a front side thereof. In a cylindrical specimen 47 shown in FIG. 12, a sectional shape of the lubrication groove cut by any plane orthogonal to the line A is a right triangle, and the

TABLE 1

| Item | | Example A1 | Example A2 | Example A3 | Example A4 | Comparative example A1 | Comparative example A2 | Comparative example A3 |
|---|---|---|---|---|---|---|---|---|
| Composition (vol %) | PPS | 60 | 60 | 60 | 60 | 60 | 60 | 77 |
| | CF | 10 | 10 | 10 | 10 | 10 | 10 | 3 |
| | PTFE | 5 | 5 | 5 | 5 | 5 | 5 | 10 |
| | GRP | 25 | 25 | 25 | 25 | 25 | 25 | 10 |
| Bending elastic modulus at 130° C. (MPa) | | 4,100 | 4, 100 | 4,100 | 4,100 | 4,100 | 4,100 | 2,000 |
| Annealing | | Yes | Yes | Yes | Yes | No | Yes | Yes |
| Maximum temperature in annealing (° C.) [1] | | 220 | 240 | 260 | 200 | — | 275 | 240 |
| Inner diameter contraction amount (mm) | | 0.05 | 0.05 | 0.05 | 0.08 | 0.15 | —[2] | 0.1 |

[1] The maximum temperature was kept for four hours.
[2] The deformation of the bearing was too large after annealing, so that the insert molding was incapable.

In Table 1, the bending elastic modulus at 130° C. means the bending elastic modulus of the molded body of the PPS resin composition before the annealing treatment is applied. As shown in Table 1, the inner diameter contraction amount of each of Examples A1 to A4 (the sliding bearings each having the elastic modulus before the annealing treatment of 4,100 MPa and the annealing temperature of 200-260° C.) is maximum depth of the lubrication groove is constant regardless of the position in the radial direction. The length of the circular arc C is longer than the length of the circular arc D. In Examples B1 to B4, since the angle θ1 is not 0 degree, the width of the lubrication groove becomes narrower toward the outer diameter side and the angle θ2 becomes gradually larger from the inner diameter side toward the outer diameter side. In Examples B1 to B4, the length L between the inner diametrical end part of the line A and the inner diametrical end part of the line B in a direction orthogonal to the line A is set to 1.7 mm.

Figure 13:
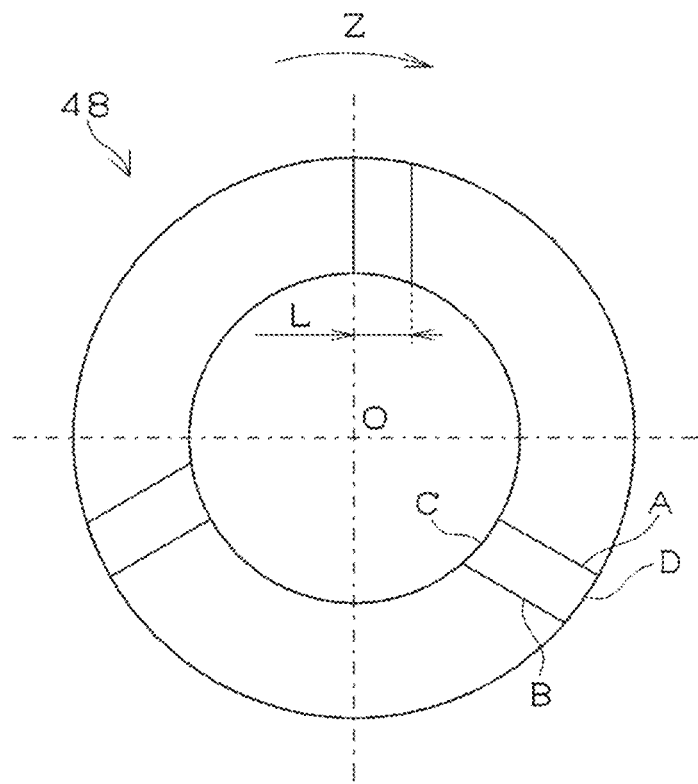
FIG. 13 is a projection view of an end surface of a specimen of each of Examples B5 to B11, seen from a front side thereof.

FIG. 13 shows a projection view of an end surface of the cylindrical specimen of each of Examples B5 to B11, seen from a front side thereof. In a cylindrical specimen 48 shown in FIG. 13, a sectional shape of the lubrication groove cut by any plane orthogonal to the line A is a right triangle, and the maximum depth of the lubrication groove is constant regardless of the position in the radial direction. The length of the circular arc C is longer than the length of the circular arc D. In Examples B5 to B11, the line A and the line B are in parallel to each other (the angle θ1 is 0 degree), and the angle θ2 is constant from the inner diameter side toward the outer diameter side. The lengths L are different in Examples B5 to B11.

Figure 14:
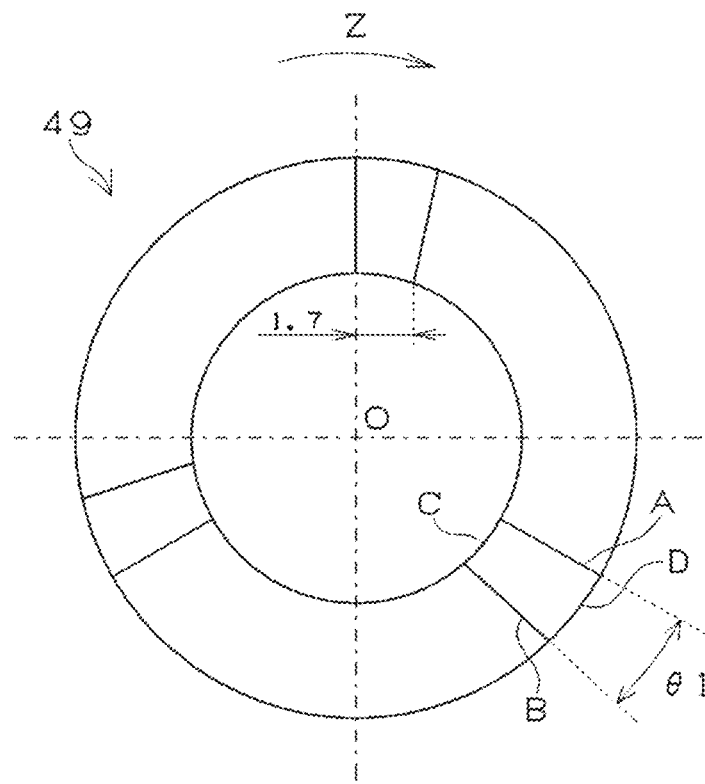
FIG. 14 is a projection view of an end surface of a specimen of Comparative example B1, seen from a front side thereof.

FIG. 14 shows a projection view of an end surface of the cylindrical specimen of Comparative example B1, seen from a front side thereof. In a cylindrical specimen 49 shown in FIG. 14, a sectional shape of the lubrication groove cut by any plane orthogonal to the line A is a right triangle, and the maximum depth of the lubrication groove is constant regardless of the position in the radial direction. The length of the circular arc C is shorter than the length of the circular arc D. Thus, the width of the lubrication groove becomes wider and the angle θ2 becomes gradually smaller toward the outer diameter side.

Figure 15:
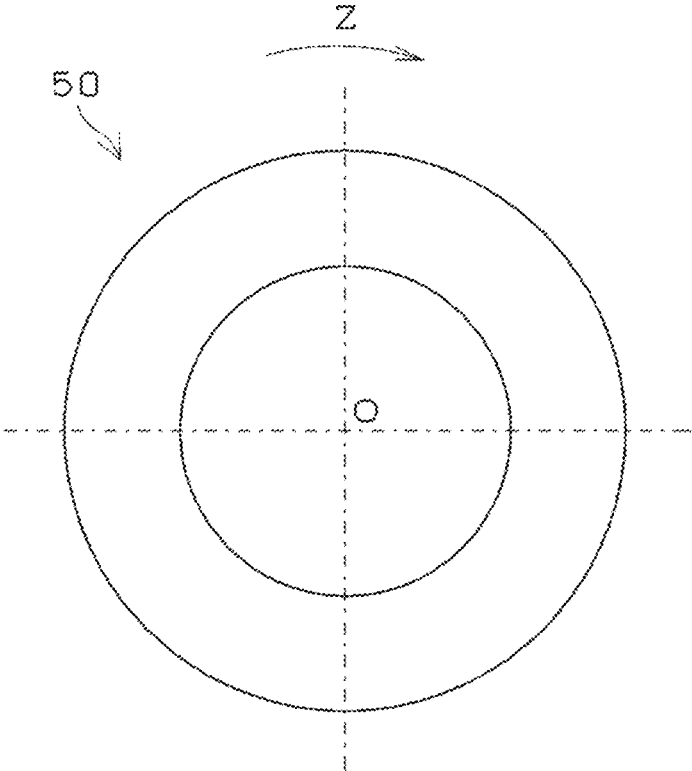
FIG. 15 is a projection view of an end surface of a specimen of Comparative example B2, seen from a front side thereof.
Figure 16:
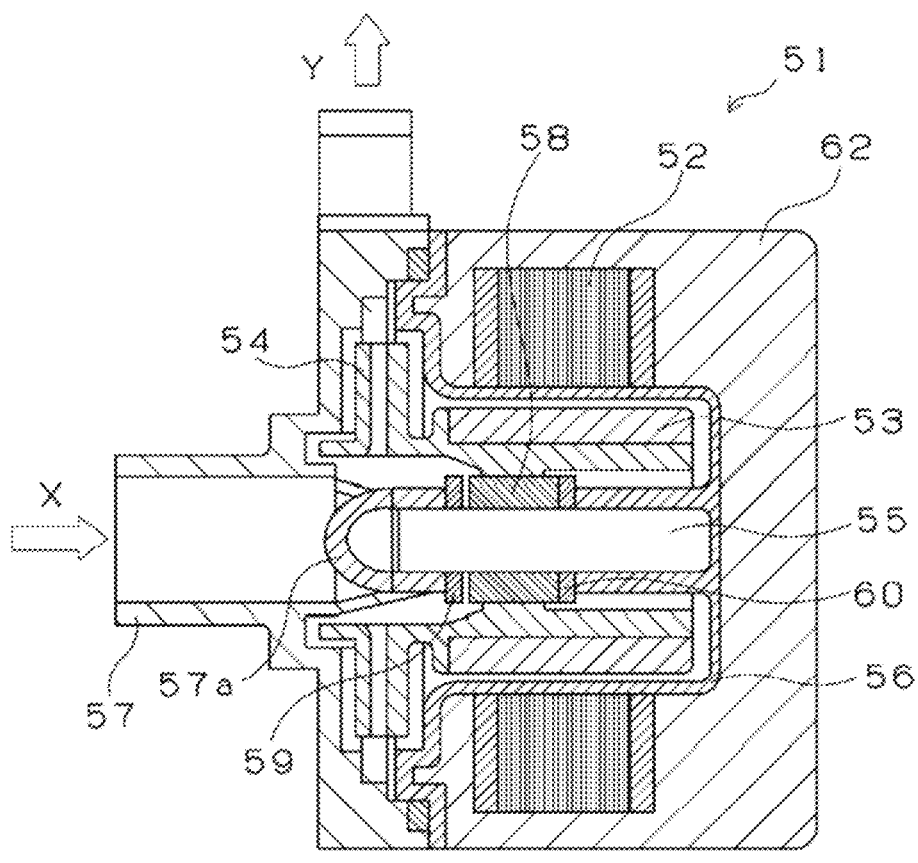
FIG. 16 is a side sectional view of a conventional water pump.

FIG. 15 shows a projection view of an end surface of the cylindrical specimen of Comparative example B2, seen from a front side thereof. A lubrication groove is not formed on an end surface of a cylindrical specimen 50 shown in FIG. 15.

The flatness (based on JIS B0621-1984) of the land part of each of the produced cylindrical specimens was measured using a dial gauge. Further, the presence and absence of the weld on the land part was observed using an optical microscope.

The dynamic friction coefficient in an antifreeze solution (ethylene glycol 50 vol % and water 50 vol %) of each of the produced cylindrical specimens and the disc-shape mating materials (SUS304) was measured using a ring on disc tester. The test condition is velocity of 125 m/minute, a load of 38 N, and temperature of 30° C. The size of each of the cylindrical specimens and the test result thereof are shown in Tables 2 and 3. The angle θ2 of each of the cylindrical specimens shown in Table 2 continuously changes in the radial direction, and thus the maximum value and the minimum value thereof are shown.

TABLE 2

| Item | | Example B1 | Example B2 | Example B3 | Example B4 | Comparative example B1 |
|---|---|---|---|---|---|---|
| Angle (degree) | θ1 | 10 | 15 | 15 | 20 | 10 |
| | θ2 | Min 10 Max 16 | Min 10 Max 23 | Min 16 Max 36 | Min 10 Max 43 | Min 7 Max 10 |
| Maximum depth H (mm) | | 0.3 | 0.3 | 0.5 | 0.3 | 0.3 |
| Length of circular arc C (mm) | | 1.73 | 1.73 | 1.73 | 1.73 | 1.73 |
| Length of circular arc D (mm) | | 1.04 | 0.69 | 0.69 | 0.32 | 2.34 |
| Dynamic friction coefficient | | 0.027 | 0.023 | 0.055 | 0.06 | 0.055 |
| Presence/absence of weld on land part | | None | None | None | None | None |
| Flatness (mm) | | 0.03 | 0.03 | 0.03 | 0.03 | 0.03 |
| Presence/absence of noise due to vibration | | None | None | None | None | None |

TABLE 3

| Item | | Example B5 | Example B6 | Example B7 | Example B8 | Example B9 | Example B10 | Example B11 | Comparative example B2 |
|---|---|---|---|---|---|---|---|---|---|
| Angle (degree) | θ1 | 0 | 0 | 0 | 0 | 0 | 0 | 0 | — |
| | θ2 | 10 | 10 | 10 | 5 | 20 | 30 | 30 | — |
| Maximum depth H (mm) | | 0.3 | 0.3 | 0.3 | 0.1 | 0.3 | 0.3 | 0.6 | — |
| Length of circular arc C (mm) | | 1.73 | 1.73 | 1.73 | 1.73 | 1.73 | 1.73 | 1.73 | — |
| Length of circular arc D (mm) | | 1.71 | 1.71 | 1.71 | 1.71 | 1.71 | 1.71 | 1.71 | — |
| Length L (mm) | | 1.70 | 1.70 | 1.70 | 1.14 | 0.82 | 0.52 | 1.04 | — |
| Dynamic friction coefficient | | 0.031 | 0.04 | 0.051 | 0.039 | 0.034 | 0.041 | 0.043 | 0.066 |

TABLE 3-continued

| Item | Example B5 | Example B6 | Example B7 | Example B8 | Example B9 | Example B10 | Example B11 | Comparative example B2 |
|---|---|---|---|---|---|---|---|---|
| Presence/absence of weld on land part | None | Yes | Yes | None | None | None | None | Yes |
| Flatness (mm) | 0.03 | 0.08 | 0.09 | 0.03 | 0.05 | 0.03 | 0.03 | 0.09 |
| Presence/absence of noise due to vibration | None | None | Yes | None | None | None | None | Yes |

As shown in Table 2, Example B1 ($\theta 2$ is 10-16 degrees), Example B2 ($\theta 2$ is 10-23 degrees) and Example B4 ($\theta 2$ is 10-43 degrees) each has the minimum of the angle $\theta 2$ of 10 degrees and the maximum depth of 0.3 mm, however the angles $\theta 1$ thereof are different from each other. Each of Example B1 ($\theta 1$ is 10 degrees), Example B2 ($\theta 1$ is 15 degrees) is low friction compared to Example B4 ($\theta 1$ is 20 degrees). Example B3 ($\theta 2$ is 16-36 degrees and the maximum depth is 0.5 mm) has the angle $\theta 2$ larger than those of Example B1 and Example B2, and has large dynamic coefficient. The reason of this is assumed that the dynamic pressure generation effect is deteriorated as the angle $\theta 2$ becomes larger. Comparative example B1 ($\theta 2$ is 7-10 degrees) has the smaller angle $\theta 2$, however since the length of the circular arc C is shorter than the length of the circular arc D (C<D), the width of the groove expands toward the outer diameter side and thus the dynamic pressure generation effect is deteriorated. As a result, the dynamic friction coefficient of Comparative example B1 is larger than those of Examples B1, B2, and B5 to B11.

Further, as shown in Table 3, Examples B5 to B11 each has the line A and the line B parallel to each other, however the angles $\theta 2$ and the maximum depths thereof are different from each other. Examples B5, B6, and B8 to B11, which have the angle $\theta 2$ of 5-30 degrees and the maximum depth of 0.1-0.6 mm, are low friction in which the dynamic friction coefficient is 0.031-0.043. Example B7 of which the flatness is 0.09 mm has the dynamic friction coefficient of 0.051 which is slightly large. Comparative example B2 without the lubrication groove on the end surface thereof, has the dynamic friction coefficient of 0.066 which is larger than all other Examples. Examples B5, and B8 to B11 each has the lubrication groove near the intermediate portion between the adjacent gates, and a weld line is formed within the lubrication groove. Examples B6 and B7 each has the lubrication groove far from the intermediate portion between the adjacent gates, and a weld line is formed on the land part.

INDUSTRIAL APPLICABILITY

The rotor for electric water pumps of the first invention can be produced at a low cost, and the radial gap can be managed accurately. Accordingly the rotor for electric water pumps of the first invention can be preferably used as a rotor for an electric water pump for cooling inverters or combustion engines of automobiles. Further, the sliding bearing device of the second invention is superior in low friction property and silent performance. Accordingly, the sliding bearing device of the second invention can be preferably used as a sliding bearing device for a water pump for circulating cooling water in combustion engines, inverters, batteries and fuel cells in automobiles or for circulating hot water in water heaters and floor heaters. The sliding bearing device of the second invention is not limited to the use for the water pump that circulates water. The sliding bearing device of the second invention is suitably applied to a pump that moves and supplies water. Further, a similar effect can be realized in a case in which the sliding bearing device of the second invention is applied to a pump that circulates, moves and supplies liquid media such as chemical solution, solvent, oil and beverage other than water.

REFERENCE SIGNS LIST

1: rotor for electric water pumps
2: main body
3: sliding bearing
4: magnet
5: impeller mount part (PL)
6: parting line
31: water pump
32: winding
33: permanent magnet
34: impeller
35: shaft
36: casing
37: cover
38, 38': sliding bearing
39: thrust plate
40: thrust plate
41: packing
42: motor
43: land part
44: lubrication groove
45: land part
46: lubrication groove
47: cylindrical specimen
48: cylindrical specimen
W: weld part

The invention claimed is:

1. A sliding bearing device for water pumps, the sliding bearing device being configured to be used in a water pump having an impeller, a shaft that fixes the impeller, a cylindrical sliding bearing fixed to the impeller for rotatably supporting the impeller relative to the shaft, cylindrical thrust receivers that slide on respective end surfaces of the sliding bearing, and a casing and a cover that house the impeller and form a pump chamber, the water pump being configured to suck and discharge circulation water through the pump chamber using rotation of the impeller, the sliding bearing device for water pumps comprising the sliding bearing and the thrust receivers, wherein:

a land part serving as a sliding surface, and a lubrication groove that discharges the circulation water from an inner diameter side toward an outer diameter side are formed on a surface of at least one component of at least one end surface of the sliding bearing, and a thrust receiver of the thrust receivers, the lubrication groove has an inclined surface inclined relative to the land part and is configured to generate dynamic pressure due to the relative rotation between the sliding bearing and the thrust receiver, in a projection view of the surface on which the lubrication groove is formed, seen from a front side thereof, the lubrication groove is formed by a region surrounded by: a line A and a line B, where each of A and B extends on the surface from the inner diameter side to the outer diameter side; a circular arc C along an inner diametrical surface; and a circular arc D along an outer diametrical surface, the lubrication groove has a groove width formed by the line A and the line B, the line A and the line B are straight, an extension of the line A passes through an axial center of the component on which the lubrication groove is formed, the length of the circular arc C is more than the length of the circular arc D, wherein an angle between the line A and the line B is 0-15 degrees, wherein the lubrication groove is a plurality of lubrication grooves, and the lubrication grooves are disposed on the respective surfaces of the at least one component at any intervals in the circumferential direction, each of the lubrication grooves is disposed offset, from each line A, toward a downstream side in a direction of the relative rotation, the lubrication grooves have a groove side surface formed by the line B, a groove bottom surface connected to the groove side surface and inclined toward the land part, and the groove bottom surface has a groove depth that becomes smaller toward the line A, and an inclined surface, having a gradient steeper than the groove bottom surface, is formed on a boundary between an end portion of the groove bottom surface at an upstream side in a rotational direction and the land part.

2. The sliding bearing device for water pumps as defined in claim 1, wherein:

the line A is located at an upstream side relative to the line B in a direction of the relative rotation, a sectional shape of the lubrication groove cut by any cutting plane orthogonal to the line A is generally a right triangle having a hypotenuse on the inclined surface, and an inner angle relating to an apex defined by an intersection point between the line A and the cutting plane is 3-30 degrees.

3. The sliding bearing device for water pumps as defined in claim 1, wherein the maximum depth of the lubrication groove is 0.1-1.0 mm.

4. The sliding bearing device for water pumps as defined in claim 1, wherein:

the sliding bearing is an injection-molded body of a resin composition, the sliding bearing has the lubrication groove on the at least one end surface thereof, the sliding bearing has a gate mark on the outer diametrical surface, and a weld part is formed within the lubrication groove and is not formed on the land part.

* * * * *